(12) United States Patent
Lugg

(10) Patent No.: US 8,851,415 B1
(45) Date of Patent: Oct. 7, 2014

(54) MAGNETIC AERODYNAMIC GENERATION LIFT INTEGRATED FLIGHT TECHNOLOGY WITH JOINT ELECTRIC THRUST

(76) Inventor: Richard H. Lugg, Falmouth, ME (US)

( * ) Notice: Subject to any disclaimer, the term of this patent is extended or adjusted under 35 U.S.C. 154(b) by 11 days.

(21) Appl. No.: 13/455,461

(22) Filed: Apr. 25, 2012

Related U.S. Application Data

(60) Provisional application No. 61/479,211, filed on Apr. 26, 2011.

(51) Int. Cl.
*B64C 27/12* (2006.01)

(52) U.S. Cl.
USPC ..................................... 244/17.11

(58) Field of Classification Search
USPC ........ 244/17.11, 17.25, 17.19, 53 R; 310/267
See application file for complete search history.

(56) References Cited

U.S. PATENT DOCUMENTS

2007/0126292 A1* 6/2007 Lugg ............................. 310/11
2010/0230547 A1* 9/2010 Tayman ......................... 244/7

* cited by examiner

*Primary Examiner* — Philip J Bonzell
*Assistant Examiner* — Nicholas McFall
(74) *Attorney, Agent, or Firm* — Caseiro Burke LLC; Chris A. Caseiro

(57) ABSTRACT

An integrated hybrid electric power generation system for producing jet thrust, a superconducting direct drive turbine ring motor for vertical lift, multi-megawatt electric current generation and a pulse-phased high power directed energy weapon (DEW). The system is managed electrically, and may be mated directly to a magnetic aerodynamic generation of rotorhead optimized control as a direct drive electric lift-jet thrust rotorcraft system (DDELJTRS) manifesting an all flight managed controls and weaponized electric system in rotorcraft, vertical lift, aerodynamic flight control, directed energy weapon and jet propulsion for forward flight high speed cruise.

2 Claims, 3 Drawing Sheets

MAGNETIC AERODYNAMIC GENERATION LIFT INTEGRATED FLIGHT TECHNOLOGY WITH JOINT ELECTRIC THRUST

CROSS REFERENCE TO RELATED APPLICATION

The present application is a nonprovisional, and claims the priority benefit of, U.S. provisional patent application Ser. No. 61/479,211, filed Apr. 26, 2011, of the same title and same inventor. The entire content of that provisional application is incorporated herein by reference.

FIELD OF THE INVENTION

The invention pertains to the full integration of a hybrid electric power generation system(s) and a jet thrust gas turbine engine, producing jet thrust, a superconducting direct drive turbine ring motor for vertical lift, multi-megawatt electric current in AC or DC mode, pulse phased to a high power directed energy weapon (DEW), all managed electrically, and mated directly to a magnetic aerodynamic generation of rotorhead optimized control (MAGROC, U.S. patent application Ser. No. 12/976,687, filed Dec. 22, 2010, incorporated herein by reference) as a direct drive electric lift-jet thrust rotorcraft system (DDELJTRS) manifesting an all flight managed controls and weaponized electric system in rotorcraft, vertical lift, aerodynamic flight control, directed energy weapon and jet propulsion for forward flight high speed cruise.

SUMMARY OF THE INVENTION

This fully integrated all hybrid electric flight control, power and propulsion system for both manned and unmanned rotorcraft (helicopters) has at its core a magnetic advanced generation shaft horsepower axial fan turbine (MAGSHAFT) producing massive amounts of electricity through an embedded superconducting turbine ring generator delivering 2.5 megawatts to power a horizontally mounted and embedded superconducting ring motor into a rotorcraft fuselage/aircraft (manned or unmanned), to which is integrated MAGROC (which governs pitch, roll and yaw axis electrically through electromagnetic actuators in the rotor blades), where MAGROC is in the shape of a Frisbee disc with the embedded actuators, and is magnetically suspended and rotates at the exact design speed for vertical lift in hover, or transitional speed at differing RPMs, electrically to high speed forward flight, and simultaneously powers an embedded electric ring motor Fenestron fan (which counters torque loads from the rotating MAGROC, and also is managed electrically, while the balance of electric power of 2.5 MW operates the electric counter rotating compressor in the electric MAGSHAFT compressor. Once the vehicle is in forward flight and is not hovering, but may be transitioning, or in high speed cruise, retreating blade stall may be removed by MAGROC, offering the complete actuated segmentation of each rotorblade, one from another (this is done electrically), MAGROC is rotated for the vertical lifting portion of flight by the embedded superconducting ring motor (SRM), while simultaneously it is propulsed by the embedded superconducting turbine ring generator (STRG) in MAGSHAFT, and that STRG, being a thrust turbine (twin counter rotating turbines driven by combustion exhaust from the combustion of jet fuel in the MAGSHAFT combustor) produces horizontal propulsive thrust for the rotorcraft to attain flight cruise speeds of 500 KTAS (knots true air speed) and higher. Retreating blade stall is the limiting aerodynamic factor in rotorcraft that has held up high forward flight speeds in rotorcraft (unmanned) and helicopters (manned). MAGROC removes this by, with very high frequency adjustment of aerodynamic angles of attack, of the retreating blade (in the $1^{st}$ and $2^{nd}$ quadrant of the rotordisc). Simultaneously, electric jet thrust is produced, the turbine is segmented and spun electrically by compressed air generated electrically in the compressor, this power thus gives the high speed cruise component for 500+ KTAS forward flight. Because it is a fully integrated lift, propulsion, flight control and electric energy weapons system, the rotorcraft can slow down to hover with control for MAGROC, power reduced to for horizontal thrust by shutting down one of the STRGs and all the power from one STRG can provide 2.0 MW for the integrated directed energy weapon in the rotorcraft. Hover out of ground effect is improved with the segmented rotorblade aerodynamics from MAGROC, so for the first time, the DEW can be payloaded and operated (technology today requires 1.0 to 2.0 MW to make DEW effective as a kill weapon at 10-12% loaded power, and step pulsed phase managed power).

The present invention provides a fully integrated and managed operational rotorcraft system, unmanned or manned, providing; electric direct lift, horizontal jet thrust propulsion, electromagnetic swashplateless flight control, and directed energy weapons capability in a single airborne weapons platform. The invention includes a segmented magnetic shaft gas turbine engine, which provides multi-megawatt electric power to an embedded superconducting ring motor (2.0 to 5.0 MW) rotating MAGROC directly (without a transmission, lubricants, pumps, etc) creating vertical lift by which a portion of propulsive power can be jet thrust, and not electric lift, to transition the rotorcraft out of, hover out of ground effect (HOGE), and move the rotorcraft to high speed forward flight, and simultaneously removing the deleterious effects of retreating blade stall (which causes violent pitching motions in all rotorcraft known today above 180 KTAS) in the now electric rotating MAGROC. The segmented MAGSHAFT allows for this capability, and more so, the segmentation, through the electric power architecture, whereby electricity can be moved to the directed energy weapon, to fire a solid state energy architecture. Thus is a pulse phase architecture where by the electric switching of the segmented MAGSHAFT and the SRM maybe shared for the DEW, therefore no extra volume or extra weight penalty is observed in this fully integrated system.

All rotating electromagnetic machinery is magnetic, all levitated against specific Halbach arrays in the superconducting ring motor which rotates MAGROC, whereby MAGROC has levitated ring machine actuators which are magnetically levitated, and where STRG generating power is magnetically levitated in its own Halbach arrays in the turbine generator section of MAGSHAFT. MAGROC with rotorblades attached, creates controlled vertical lift, and because of the position of the engine, which is unique because the transmission and clutch assembly has been removed (SRM offers direct superconducting direct drive), lift propulsion from the rotorblades serves as adding to bypass and cooling air to the MAGSHAFT from the forward mounted intake ducts on the DEMON unmanned rotorcraft, for example. MAGROC (activated with electric and magnetic high density torque fields rather than mechanical linkages upon rotorblades through a swashplate device) provides for a vertical take-off and landing rotorcraft air vehicle (manned helicopter or vertical takeoff and landing unmanned air vehicle, VTOLUAV), whether being a typical helicopter, a tiltrotor, a counter rotating single axial rotorcraft or twin rotor helicopter aircraft.

The MAGROC invention provides a new method of actuation and flight control for all types of rotorcraft (helicopters) whereby cyclic inputs to the blades, and pitch and roll input to the blades are not controlled mechanically but are controlled by a novel and unique electromagnetic actuation and control system. The magnetic control system takes rotorbiade inputs from manipulated magnetic fields within the constraint of each rotorbiade location in the rotorhead, and are generated by permanent magnet motors located in the rotorhead (one PM motor per blade, so for a five blade rotor head, there will be five PM motors whose shafts are attached to a permanent magnet array on the shaft), which as directed by sensored control inputs for correct flight path of the rotorcraft, forward flight, directional controlled flight and vertical ascent and descent gain is achieved. In the location of each PM motor in the five blade rotorhead for example, its shaft where PMs are attached, lie in plane to each rotorbiade, inserted to the specific rotorhead receptacle for each blade, each blade receives a set of permanent magnets (one lying in parallel to the leading edge root and one lying in parallel to the trailing edge root of each rotorcraft rotorhead), which align in close proximity to the rotating PMs on the shaft of the PM motor in the rotorbiade head. The PM motor with the PMs on its shaft is electrified from an on board power generation source (embedded generator in a gas turbine or superconducting electromagnetic storage device or hybrid fuel cell generation and storage device, for example) and has a microprocessor controller which controls shaft speed and direction, whereby these directional change velocities create a high density magnetic torque field which controls direction of pitch of each rotorblade inserted in the rotorblade receptacle in the rotorhead, as it rotates with the other rotorblades through the 360 degree arc of rotorblade rotation needed for lift and directional control for any said rotorcraft vehicle platform. Angle of pitch of any given rotorblade in the five blade rotorhead example to achieve controlled flight is governed by software flight control processors and central computing in the case of an unmanned rotorcraft, or pilot control inputs, where the correct pitch angle is achieved electromagnetically and without the need for swash plates required to connect mechanical linkages to the rotorblade heads. Here the magnetic fields are proportional directly to the amount of pitch angle required in any one-fifth of the 360 degree quadrant as the rotorhead rotates from the power of the rotorcraft engine. The MAGROC invention gives absolute precise force control beyond anything achievable with hydraulically driven mechanical linkages, and additionally offers a greater margin of safety.

An embodiment the invention offers a new method of design for a rigid rotorhead where no flapping mechanism is required for stability of the rotorcraft vehicle as this is provided at a very high rate of precise flight control via the electromagnetic actuation and flight control system due to high rate of control speed input for cyclic, pitch and roll angles of attack, at each rotor blade hub. Lead and lag of the rotor blades are not mechanically held to separate mechanical rotorhead bladeholders, and the lead and lag may be retained instead of large bolt and nut attachments, by the high density magnetic torque field produced by opposing permanent magnets in the rotorblade and direct current induction motors turning magnets attached to a shaft in the rotorhead, within the field of fixed magnets of the rotor blade. Advances in rotorblade head technology in rotorcraft have been limited by mechanical control designs utilizing linkages and rotating component systems termed swashplates, to deliver the required mechanical forces and provide pitch and roll changes in rotorblades, and then the order of cyclic positioning to provide pitch and roll dependent on rotorblade position within the 360 degree rotation of a rotorcraft rotorhead during powered flight. Yaw inputs to the rotorcraft vehicle control straight line flight via offsetting the counter rotating torque created by the rotating rotorhead through directional thrust changes at the tail rotor, which are typically controlled through mechanical linkages in tail rotor designs, a technical approach more than eighty years old. The mechanical main rotorhead and tailrotor designs that can be replaced by the invention method of the magnetic flight and actuation control system in rotorcraft are very complex in nature, adding to high maintenance costs with large amounts of down time on rotorcraft hence breeding escalated maintenance costs, which typically have driven large operational inefficiencies in rotorcraft fleets whether in commercial or military aviation. Methods of activating flight control using non-mechanical systems offers advantages as in fewer moving parts, lower weight and complexity of flight control and actuation systems, higher precision inputs to flight control actuation of the rotorblades and rotorhead, and additionally very high aerodynamic efficiencies in hovering maneuvers and in forward flight.

DESCRIPTION OF THE PREFERRED EMBODIMENTS

Figure 1:
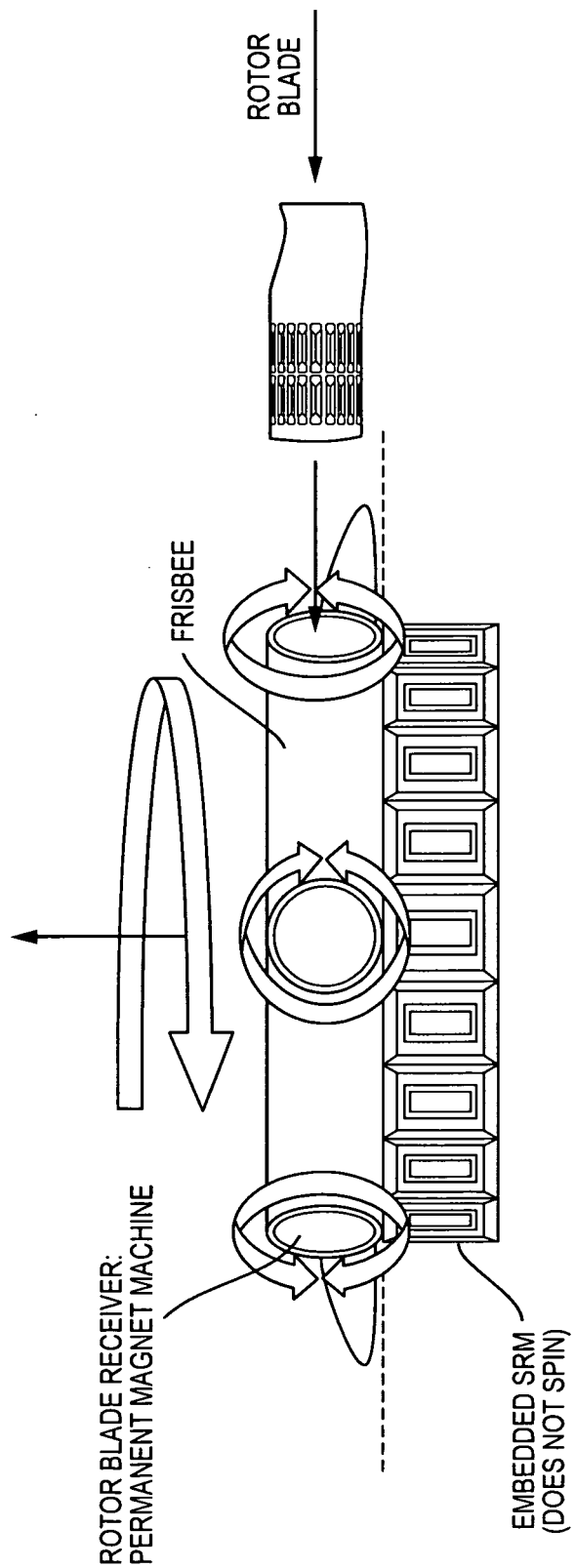
FIG. 1 is a representative side view of the rotor configuration of the present invention.
Figure 2A:
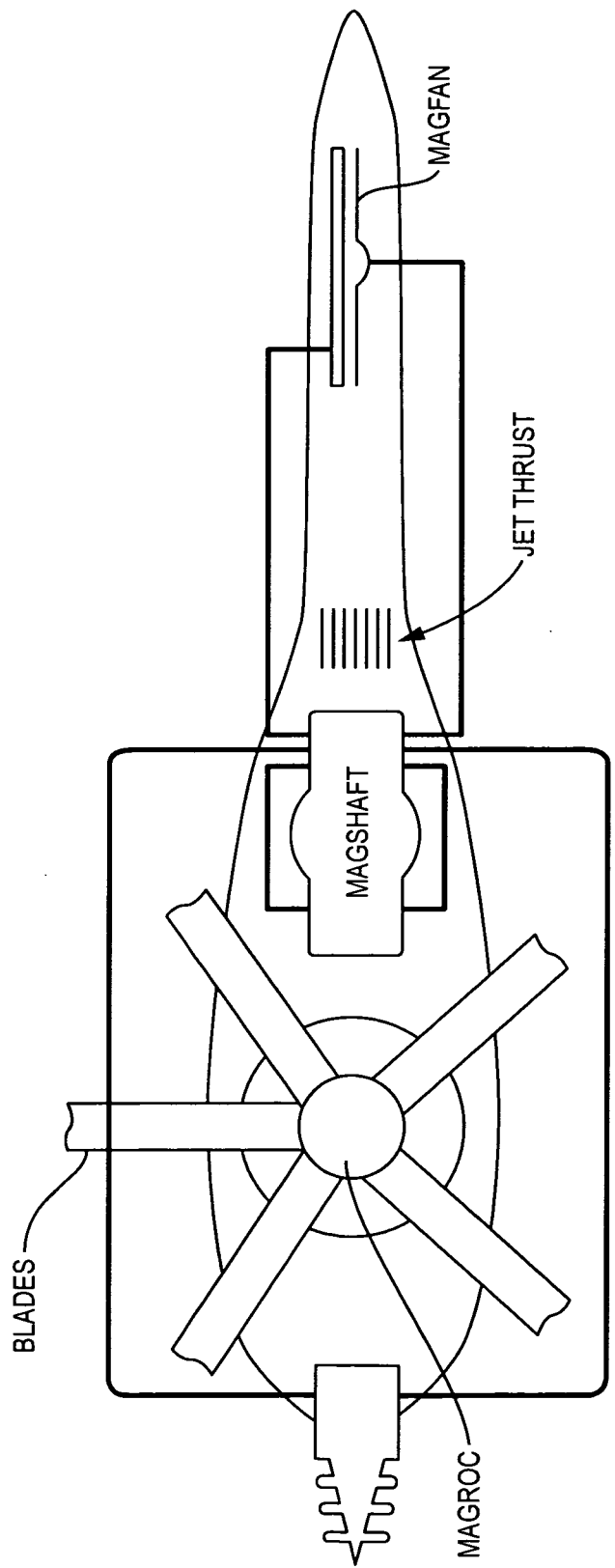
FIG. 2A is a simplified top view of the let system of the present invention and FIG. 2B is a diagrammatic representation of the jet system of the present invention.
Figure 2B:
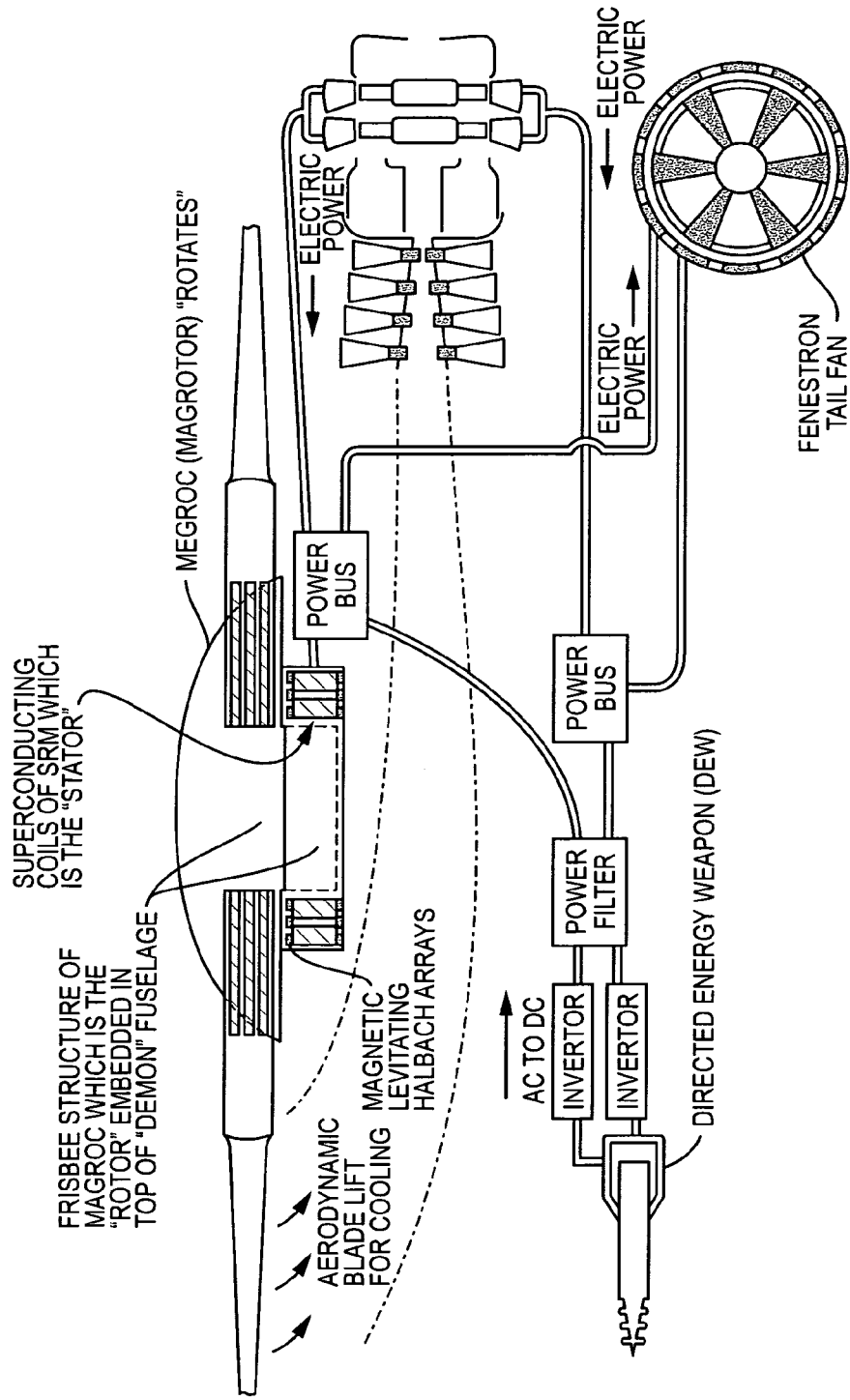

A rigid rotorhead of the present invention shown in respect to FIGS. 1-2B includes N number of blades whereby the cyclic inputs to the blades (vertical ascent and vertical descent) as well as pitch and roll input, to the blades, are not controlled mechanically as with a swashplate and associated pushrods and hydraulic actuators (whereby in the known art rotorblades with a swashplate mechanism move equally in pitch as required for vertical lift, pitch and roll control dependent on the attitude of input to the swashplate, therefore all the blades, 2, 3, 4 . . . N are linked), but are controlled by an electromagnetic permanent magnet machine which inserts into the frisbee shape of the electromagnetic MAGROTOR rotorhead. The permanent magnet machine is essentially a magnetic transmission switch so designed to carry very high out of plane loads of each rotorblade as it is rotating, therefore a novel architecture is required with mechanical loading bearings interior and exterior to the axial length of the blade inserted into the Frisbee with the PM machine.

Pitch of each rotorblade is defined in the application of MAGLIFTJET actuation and control system, whereby three concentric rings govern a pitch movement of 8 degrees positive pitch and 4 degrees negative pitch. Actuation occurs through electronic software control on the position of an intermodular magnetic array (as referenced in the MAGROTOR Patent) where by its position interrupts the continuous normal generation of the magnetic field flux between the outer concentric magnetic ring and the inner magnetic concentric ring. The IMA sits as a concentric ring itself between the inner and outer PM array which provides the magnetic power to adjust the pitch of each blade, whereby the IMA rotates positive or negative of minus four degrees and or plus eight degrees. Dependent on the position of the IMA in reference to the North and South poles of the permanent magnets of the inner or outer permanent magnet machine arrays providing the permanent magnet power to control the pitch with the accordance of the position of the IMA referenced to the two other rings. Software may be used in combination with an electric circuit and an actuator to adjust the position of each IMA in each rotorblade PM insert in the Frisbee of the MAGROTOR rotorhead.

The magnetic control system takes rotorblade inputs from manipulated magnetic fields by the IMA and its related position to the inner and outer PM rings, within the constraint of each rotorblade location in the rotorhead, which are generated by permanent magnet motors located in the rotorhead, whereby each PM motor spins constantly at speed the inner concentric ring at 5000 rpm, the IMA adjusts its position in reference to the outer concentric ring in the rotorblade, which is inserted into the Frisbee. There is one PM motor per blade, so for a five-blade rotor head there will be five PM motors (the shafts to which are attached the inner permanent magnet array concentric ring holding the PM to each associated shaft), which as directed by the sensored electric control inputs from the IMA, interrupting, or positioning the blade pitch (holding only momentarily between the rotating magnetic field of the PM motor driven inner concentric ring and the relatively fixed outer concentric ring in each rotorblade), required for each blade in the 360 degree rotor disc path for correct flight path of the rotorcraft, flight control response for cyclic and vertical ascent and descent is obtained.

Semi-rigid multi-blade electromagnetic actuation and control system for the invention has a flapping hinge point aft of the PM motor in what may be described as a rotorblade holder, which generates the controlled magnetic field to the rotorblade. The invention may have an alternative embodiment in the rotorblade holder as a rigid rotorhead, whereby there is no flapping mechanism, and each blade is held in compliance in the vertical plane by the magnetic fields, with assistance (dependent on the mission loading) from the mechanical thrust bearings.

Fully articulated multi-blade electromagnetic actuation and control system for the invention has a flapping hinge point aft of the PM motor in what may be described as a rotorblade holder, and may include a lead and lag mechanism for each rotor blade as a method to change the incidence angle of the blade to the oncoming airstream which is typical of control technologies in present in rotorcraft flight control technologies in current art.

Alternatively, in another embodiment in aerodynamic control, the removal of the flapping hinge mechanism may be a necessity in defining what would be a true electromagnetic rigid articulating rotorblade for a rotorcraft (manned or unmanned). This new art would occur and be necessitated because of the power of the electromagnetic fields in the two inner and outer concentric rings holding the PM arrays, with the IMA in between governing the position of the magnetic flux, governing pitch between the rotating inner concentric ring, and the outer non-rotating ring (but rotates enough in pitch to govern rotorblade control and required flight paths). In relation to the rotating shafts of the PM motor attached to the inner concentric ring, enshrouded in a cylinder so to speak by the outer concentric ring housing holding each rotorblade, lead and lag requirements of the rotating rotor blades may be accomplished by generation of active electromagnetic fields functioning in the lead lag horizontal plane, about the neutral pitch axis, to accommodate retreating blade stall, or the removal of it, and improve high speed forward flight by electromagnetically precisely positioning, at any point along the 360 rotating arc, any one of multiple blades, to optimize and maximize lift/drag coefficients and Reynolds numbers of all the rotating blades, at the precise positioning in time, with each blades respective rotation as attached to the respective position of the electromagnetic rotorhead.

In the alternative method of no flapping hinge, and lead lag adjustment of each rotorblade, retreating blade stall is removed or reduced by the milli-second adjustment in pitch of each blade, which is now possible from the magnetic PM machine holding and functioning for each blade in the Frisbee, and therefore it is minutely adjusted as it passes through the lower left hand quadrant of the 360 degree rotordisc arc. This micro control, because of the complete electromagnetic segmentation of each blade, now begin able to act independently in any quadrant, in respect to the others, for the first time is now addressing retreating based stall. IN this lower left hand quadrant, the pitch angle for that blade and each subsequent blade is positioned in pitch so it is not stalling as forward flight speed is increased.

It will be obvious to those recently skilled in the art that modifications to the apparatus and process disclosed here in may occur, including substitution of various component values or nodes of connection, without parting from the true spirit and scope of the disclosure.

What is claimed is:

1. An electromagnetic rotorcraft lift system comprising:
   a. an electromagnetic swashplateless rotorhead including a plurality of rotorblades, each of the plurality of rotorblades having a corresponding set of permanent magnets with one permanent magnet lying in parallel to a leading edge root of the rotorblade and one permanent magnet lying in parallel to a trailing edge root of the rotorblade;
   b. a superconducting ring motor coupled to the rotorhead, the superconducting ring motor including a Hallbach array; and
   c. a segmented magnetic shaft gas turbine engine coupled to the motor, wherein the segmented magnetic shaft gas turbine engine includes one or more superconducting ring generators.

2. The system of claim 1 wherein the segmented magnetic shaft gas turbine engine may be used to produce electricity.

* * * * *